US010571164B2

(12) United States Patent
Durrani et al.

(10) Patent No.: US 10,571,164 B2
(45) Date of Patent: Feb. 25, 2020

(54) AIR-CONDITIONING SYSTEM OF A MOTOR VEHICLE AND METHOD FOR OPERATING THE AIR-CONDITIONING SYSTEM

(71) Applicant: Hanon Systems, Daejeon (KR)

(72) Inventors: Navid Durrani, Elsdorf (DE); Roberto Della Rovere, Kerpen (DE); Marc Graaf, Krefeld (DE)

(73) Assignee: HANON SYSTEMS, Daejeon (KR)

( * ) Notice: Subject to any disclaimer, the term of this patent is extended or adjusted under 35 U.S.C. 154(b) by 103 days.

(21) Appl. No.: 15/067,656

(22) Filed: Mar. 11, 2016

(65) Prior Publication Data
US 2016/0265819 A1 Sep. 15, 2016

(30) Foreign Application Priority Data

Mar. 13, 2015 (DE) .......................... 10 2015 103 681

(51) Int. Cl.
*F25B 25/00* (2006.01)
*F25B 5/02* (2006.01)
(Continued)

(52) U.S. Cl.
CPC .............. *F25B 25/005* (2013.01); *F25B 5/02* (2013.01); *F25B 40/04* (2013.01);
(Continued)

(58) Field of Classification Search
CPC ............... F25B 25/005; F25B 40/04; F25B 2313/0272; F25B 5/02; B60H 2001/00121; B60H 1/00342
See application file for complete search history.

(56) References Cited

U.S. PATENT DOCUMENTS 2,077,296 A * 4/1937 Wilkes .................... F25B 13/00
62/125
8,156,754 B2 4/2012 Hong et al.
(Continued)

FOREIGN PATENT DOCUMENTS

DE 102004001233 A1 8/2004
DE 102012108731 A1 3/2014
(Continued)

*Primary Examiner* — David J Teitelbaum
(74) *Attorney, Agent, or Firm* — Shumaker, Loop & Kendrick, LLP; James D. Miller (57) ABSTRACT

The invention concerns an air conditioning system for the conditioning of the air of a passenger compartment of a motor vehicle. The air conditioning system has a refrigerant circuit with a compressor, a refrigerant-coolant heat exchanger for desuperheating the refrigerant after the compression, a first refrigerant-air heat exchanger and a second refrigerant-air heat exchanger, and at least one coolant circuit. The coolant circuit has a heating heat exchanger for heating an air mass flow being supplied to the passenger compartment. The refrigerant-coolant heat exchanger is designed as a component of the coolant circuit having the heating heat exchanger. The air conditioning system is designed for an operation in refrigerator mode, in heat pump mode, and in afterheating mode for the heating, cooling, and dehumidification of the air being supplied to the passenger compartment. A valve arrangement switches the air conditioning system between the different operating modes.

15 Claims, 4 Drawing Sheets

(51) Int. Cl.
*F25B 40/04* (2006.01)
*B60H 1/00* (2006.01)

(52) U.S. Cl.
CPC ............... *B60H 1/00342* (2013.01); *B60H 2001/00121* (2013.01); *F25B 2313/0272* (2013.01)

(56) References Cited

U.S. PATENT DOCUMENTS

2004/0079096 A1* 4/2004 Itoh .................. B60H 1/00735
                 62/223
2004/0134217 A1* 7/2004 Itoh ........................ F25B 13/00
                 62/324.1
2016/0305696 A1* 10/2016 Kobayashi .............. F25B 49/02
2017/0203635 A1* 7/2017 Kuroda .............. B60H 1/00899

FOREIGN PATENT DOCUMENTS

| EP | 2629040 A2 | 8/2013 | |
|---|---|---|---|
| KR | 1020040079429 A | 9/2004 | |
| KR | 1020060066843 A | 6/2006 | |
| KR | 20140023733 A | 2/2014 | |
| WO | 2012114767 A1 | 8/2012 | |
| WO | WO 2016059791 A1 * | 4/2016 | ............... B60H 1/22 |

* cited by examiner

AIR-CONDITIONING SYSTEM OF A MOTOR VEHICLE AND METHOD FOR OPERATING THE AIR-CONDITIONING SYSTEM

CROSS-REFERENCE TO RELATED APPLICATION

This patent application claims priority to German Patent Application No. 10-2015-103681.9 filed on Mar. 13, 2015, the disclosure of which is incorporated herein by reference in its entirety.

FIELD OF THE INVENTION

The invention concerns an air conditioning system for conditioning the air of a passenger compartment of a motor vehicle. The air conditioning system has a refrigerant circuit with a compressor, a refrigerant-coolant heat exchanger for desuperheating of the refrigerant after the compression, as well as two refrigerant-air heat exchangers and at least one coolant circuit. In the coolant circuit there is arranged a heating heat exchanger for heating an air mass flow being supplied to the passenger compartment. The refrigerant-coolant heat exchanger is designed as a component of the coolant circuit having the heating heat exchanger.

BACKGROUND OF THE INVENTION

The invention moreover concerns a method for operating the air conditioning system.

The air conditioning systems found in the prior art with the functions of heating, cooling, and dehumidification serve for the conditioning of the air being introduced into the passenger compartment of motor vehicles with electric and hybrid drive system, as well as internal combustion engine system.

Air conditioning systems of this kind with a coolant-air heat exchanger or heating heat exchanger, which draw their heating power from the coolant circuit of an efficient internal combustion engine or a hybrid drive system, on the one hand no longer achieve the required temperature level for a comfortable heating of the passenger compartment when outside temperatures are low, such as below −10° C. For these vehicles, the use of auxiliary heating concepts is necessary. On the other hand, heat is removed from the coolant, so that the internal combustion engine is operated for a lengthy time at low temperatures, which has negative impact on the exhaust emission and the fuel consumption. Due to the intermittent operation of the internal combustion engine in hybrid vehicles, it is no longer possible to achieve sufficiently high coolant temperature during a lengthy trip. Consequently, the start and stop operation of the internal combustion engine is disabled when outside temperatures are low. The internal combustion engine is not switched off.

Furthermore, there is a trend to complete electrification of the drive system, as in the case of vehicles driven by batteries or fuel cells. This eliminates the waste heat of the internal combustion engine as a possible heat source for warming the air.

Moreover, the quantity of energy which can be stored in the battery of the vehicle is less than the amount of energy which can be stored in the form of liquid fuel within the fuel tank. Thus, the power required for the air conditioning of the passenger compartment of an electrically operated vehicle also has a substantial influence on the range of the vehicle.

In European Pat. Appl. Pub. No. EP 2 629 040 A2 a compact heat pump system is disclosed for a motor vehicle with a heat exchanger unit, having a condenser, an integrated collector, and an undercooling heat exchanger of a refrigerant circuit. The heat exchanger unit connects the refrigerant circuit to a high temperature coolant circuit. The refrigerant circuit furthermore has a heat exchanger operating as an evaporator, constituting a connection to a low temperature coolant circuit. The refrigerant circuit consequently connects the high temperature coolant circuit to the low temperature coolant circuit. The low temperature coolant circuit is designed in particular to remove heat from components of a drive unit, the heat being transferred from the coolant to the refrigerant in the evaporator. The refrigerant surrenders the [missing object—heat?] taken up from the low temperature coolant in the condenser or undercooling heat exchanger once more to the high temperature coolant. The high temperature coolant transfers the heat taken up either to an air mass flow being supplied to the passenger compartment or to the outside air.

Consequently, the heat being transferred is surrendered by the low temperature coolant entirely to the refrigerant and by the refrigerant entirely to the high temperature coolant.

In the known heat pump systems, the desuperheating heat and the heat of condensation as well as the undercooling heat of the refrigerant is transferred entirely to the high temperature coolant. The heat can then be surrendered upon flowing through a coolant-air heat exchanger from the coolant to the air being supplied to the passenger compartment.

The heat could also be taken away to the surroundings or be utilized for heating the battery, for example.

Each time the heat is transferred indirectly by one or more coolant circuits. In the principle of indirect heat transfer, the efficiency of the overall system depends critically on the return temperature of the coolant at the entrance to the coolant-cooled condenser/gas cooler. When the coolant-cooled condenser/gas cooler is designed as a counterflow heat exchanger, the refrigerant can be cooled at most down to the entry temperature of the coolant in the condenser/gas cooler. Consequently, as the return temperature of the coolant becomes higher, the exit temperature of the refrigerant from the condenser/gas cooler also becomes larger.

Especially when an air conditioning system is operated in the heat pump mode at very low temperatures of the outside air in the range of −15° C. to −20° C., it is desirable to have return temperatures of the coolant in the range of around 55° C. to 60° C., in order to condition the passenger compartment in the shortest possible time to acceptable temperatures. In such an operating mode, the refrigerant upon leaving the condenser/gas cooler has a maximum temperature of over 55° C.

But in order to operate the air conditioning system in a very efficient manner, the refrigerant must be cooled to a temperature far below a return temperature of the coolant of 55° C.

In U.S. Pat. No. 8,156,754 B2 one finds an air conditioning system of a motor vehicle with a refrigerant circuit which is connected via a coolant-cooled heat exchanger to a high temperature coolant circuit. Upon flowing through the coolant-cooled heat exchanger, the hot gaseous refrigerant emerging from the compressor of the refrigerant circuit is desuperheated before the refrigerant leaving the coolant-cooled heat exchanger flows into a condenser/gas cooler. Upon flowing through the condenser/gas cooler additional heat is surrendered by the refrigerant to the surrounding air. The refrigerant is liquefied.

The heat surrendered in the coolant-cooled heat exchanger to the coolant is on the one hand dependent on the efficiency of the heat exchanger and on the other hand on the temperature level of the coolant. The possibility exists of dividing the desuperheating heat and the heat of condensation of the refrigerant as so-called heat loads between two heat exchangers. In this way, on the one hand, one can achieved a higher performance of the air conditioning system and on the other hand the condenser/gas cooler can be designed with smaller dimensions.

The heat transferred by the coolant-cooled heat exchanger from the refrigerant to the coolant is given off to the surrounding air in a coolant-air heat exchanger and thus diverted out of the system. The heat surrendered to the surrounding air is consequently not usable for the heating of the passenger compartment. Furthermore, the air conditioning system according to U.S. Pat. No. 8,156,754 B2 is not designed with a heat pump functionality, by which the passenger compartment can be heated in event of little or no available engine heat, especially when outdoor temperatures are low. Both the condenser/gas cooler and the evaporator will be supplied with outdoor air.

The systems known in the prior art are each designed with a refrigerant circuit which can only operate in one operating mode. The refrigerant circuits have no refrigerant-air heat exchanger for heating an air mass flow being supplied to the passenger compartment. Furthermore, the refrigerant-air heat exchangers are constantly supplied with surrounding air, which is diverted to the outside after being cooled down in the passenger compartment or after being heated. Thus, the heat carried away by the refrigerant cannot be used directly for the air mass flow being supplied to the passenger compartment.

The problem which the invention proposes to solve is to provide an air conditioning system for a motor vehicle with a refrigerant circuit with heating functionality. The system should furthermore be designed for the combined operation in refrigerator and heat pump mode and for afterheating mode for the heating, cooling, and dehumidification of the air being conditioned in the passenger compartment. It should also be possible to operate in environments with heat sources of low capacity, especially with slight waste heat of the drive system of the motor vehicle, such as in the case of energy-efficient internal combustion engine drive units and hybrid drive units composed of an internal combustion engine and an electric motor, or in electrically propelled motor vehicles, fulfilling all requirements for a comfortable climate in the passenger compartment. The comfort should be constantly maintained regardless of the operating mode, in particular, a loss of thermal power should be prevented. The refrigerant circuit should be easily composed of a minimal number of components and be able to operate in different operating modes. The system should also be usable in already existing motor vehicle architectures.

SUMMARY OF THE INVENTION

The problem is solved by the object and the method with the features of the independent patent claims. Modifications are indicated in the dependent patent claims.

The problem is solved by an air conditioning system according to the invention for the conditioning of the air of a passenger compartment of a motor vehicle. The air conditioning system has a refrigerant circuit with a compressor, a refrigerant-coolant heat exchanger for desuperheating the refrigerant after the compression, as well as a first and a second refrigerant-air heat exchanger. The air conditioning system is furthermore designed with at least one coolant circuit, which has a heating heat exchanger for heating an air mass flow being supplied to the passenger compartment. The refrigerant-coolant heat exchanger here is designed as a component of the coolant circuit having the heating heat exchanger.

According to the concept of the invention, the air conditioning system is designed for an operation in refrigerator mode, in heat pump mode, and in afterheating mode for the heating, cooling, and dehumidification of the air being supplied to the passenger compartment. The refrigerant circuit according to the invention has a valve arrangement for switching the air conditioning system between the different operating modes.

According to one preferred embodiment of the invention, the valve arrangement is configured downstream from the refrigerant-coolant heat exchanger in the flow direction of the refrigerant.

The valve arrangement is advantageously arranged in the flow direction of the refrigerant depending on the operating mode between the refrigerant-coolant heat exchanger and the first refrigerant-air heat exchanger or between the refrigerant-coolant heat exchanger and the second refrigerant-air heat exchanger. The refrigerant is taken through the refrigerant-coolant heat exchanger for the desuperheating and the surrender of heat to a coolant of the coolant circuit and through one of the refrigerant-air heat exchangers for the liquefaction and the surrender of heat to air.

Thus, the refrigerant-coolant heat exchanger is utilized along with the refrigerant-air heat exchangers additionally for the surrender of heat from the refrigerant. The coolant circulating in the coolant circuit serves as an additional heat sink for the refrigerant. The heat being carried away by the refrigerant is divided between the refrigerant-coolant heat exchanger and one of the refrigerant-air heat exchangers.

According to another modification of the invention, the second refrigerant-air heat exchanger is designed to operate as an evaporator or liquefier of the refrigerant, depending on the operating mode of the air conditioning system. By liquefaction of the refrigerant is understood here the transition from the gaseous to the liquid state of aggregation. When the refrigerant circuit is operating in the subcritical range, the refrigerant becomes heated upon liquefaction and is subsequently condensed at essentially constant temperature, and the heat exchanger is called a condenser. When the refrigerant circuit is operating in the supercritical range, the refrigerant is liquefied under a sliding temperature. The heat exchanger is called a gas cooler.

The second refrigerant-air heat exchanger for the operation in the refrigerator mode and in the afterheating mode is preferably designed to operate as an evaporator of the refrigerant for the cooling and/or dehumidification of the air being supplied to the passenger compartment and for the operation in the heat pump mode as a liquefier of the refrigerant for the heating of the air being supplied to the passenger compartment.

According to one advantageous embodiment of the invention, the first refrigerant-air heat exchanger is designed to operate as an evaporator or as a liquefier of the refrigerant, depending on the operating mode of the air conditioning system.

The first refrigerant-air heat exchanger is designed to operate as a liquefier of the refrigerant for the operation in the refrigerator mode and in the afterheating mode and as an evaporator of the refrigerant for operation in heat pump mode.

Another preferred embodiment of the invention consists in that the first refrigerant-air heat exchanger and the second refrigerant-air heat exchanger are designed to receive outdoor air, surrounding air from the passenger compartment, or a mixture of outdoor air and surrounding air from the passenger compartment. Outdoor air refers to fresh air from the outside.

According to one modification of the invention, the second refrigerant-air heat exchanger of the refrigerant circuit and the heating heat exchanger of the coolant circuit are arranged one after the other in the flow direction of the air being supplied to the passenger compartment and thus can receive the air being supplied to the passenger compartment one after the other.

According to one preferred embodiment of the invention, the refrigerant can flow in both directions through the first refrigerant-air heat exchanger and the second refrigerant-air heat exchanger as well as a first expansion element, which is coordinated with the second refrigerant-air heat exchanger.

The valve arrangement is preferably designed as a four-way valve. According to a first alternative embodiment of the invention, the valve arrangement has four shutoff valves, of which two shutoff valves have a NO characteristic and two shutoff valves have a NC characteristic.

According to a second alternative embodiment of the invention, the valve arrangement is formed from two three-way valves, wherein a first three-way valve has one inlet and two outlets and a second three-way valve has two inlets and one outlet.

According to another preferred embodiment of the invention, the refrigerant circuit is designed with an internal heat exchanger, which on the one hand is arranged between a collector and the compressor and on the other hand between the first refrigerant-air heat exchanger and the second expansion element. The internal heat exchanger is advantageously designed on the one hand so that refrigerant can flow through it in both directions.

According to one modification of the invention, the refrigerant circuit has a flow pathway extending from a branch to an opening. The flow pathway, preferably designed with one refrigerant-coolant heat exchanger for transfer of heat from a coolant to the refrigerant and a second expansion element, is advantageously arranged parallel to the second refrigerant-air heat exchanger for the conditioning of the air being supplied to the passenger compartment. The refrigerant-coolant heat exchanger is preferably operated as an evaporator of the refrigerant.

The problem is also solved by a method according to the invention for the operation of an air conditioning system for conditioning the air of a passenger compartment of a motor vehicle.

According to the concept of the invention, the air conditioning system is switched between an operation in the refrigerator mode or in the heat pump mode or in the afterheating mode to the conditioning of the air being supplied to the passenger compartment with a valve arrangement arranged in a refrigerant circuit. The refrigerant after being compressed in a compressor and before flowing into the valve arrangement is at least partly desuperheated, or desuperheated and at least partly liquefied.

According to one advantageous embodiment of the invention, the refrigerant upon flowing through a refrigerant-coolant heat exchanger is at least partly desuperheated or it is desuperheated and at least partly liquefied, whereupon heat is transferred from the refrigerant to the coolant and the heat taken up by the coolant is surrendered to the air being supplied to the passenger compartment as needed in a heating heat exchanger.

The heat being surrendered by the refrigerant is preferably divided into one part going to the refrigerant-coolant heat exchanger and a second part going to a refrigerant-air heat exchanger.

The air conditioning system according to the invention and the method for operating the air conditioning system have various benefits, in summary:
  refrigerant circuit with a minimal number of switching valves and expansion valves, and consequently with a minimal complexity and thus minimal production and maintenance costs;
  great flexibility and usage possibilities due to operation in at least six different operating modes;
  low heat losses within the valve arrangement for switching between the operating modes and this higher operating efficiency;
  refrigerant circuit can be operated with carbon dioxide as refrigerant, also known as R744;
  refrigerant circuit with an internal heat exchanger, which is not used for heat transfer in the heat pump mode; and
  can be installed with minimal expense in already existing vehicle architectures, even those with conventional air conditioning design.

BRIEF DESCRIPTION OF THE DRAWINGS

Further details, features and benefits of embodiments of the invention will emerge from the following description of sample embodiments with reference to the accompanying drawings. There are shown.

DETAILED DESCRIPTION OF EXEMPLARY EMBODIMENTS OF THE INVENTION

The following detailed description and appended drawings describe and illustrate various exemplary embodiments of the invention. The description and drawings serve to enable one skilled in the art to make and use the invention, and are not intended to limit the scope of the invention in any manner.

Figures 1A, 1B:
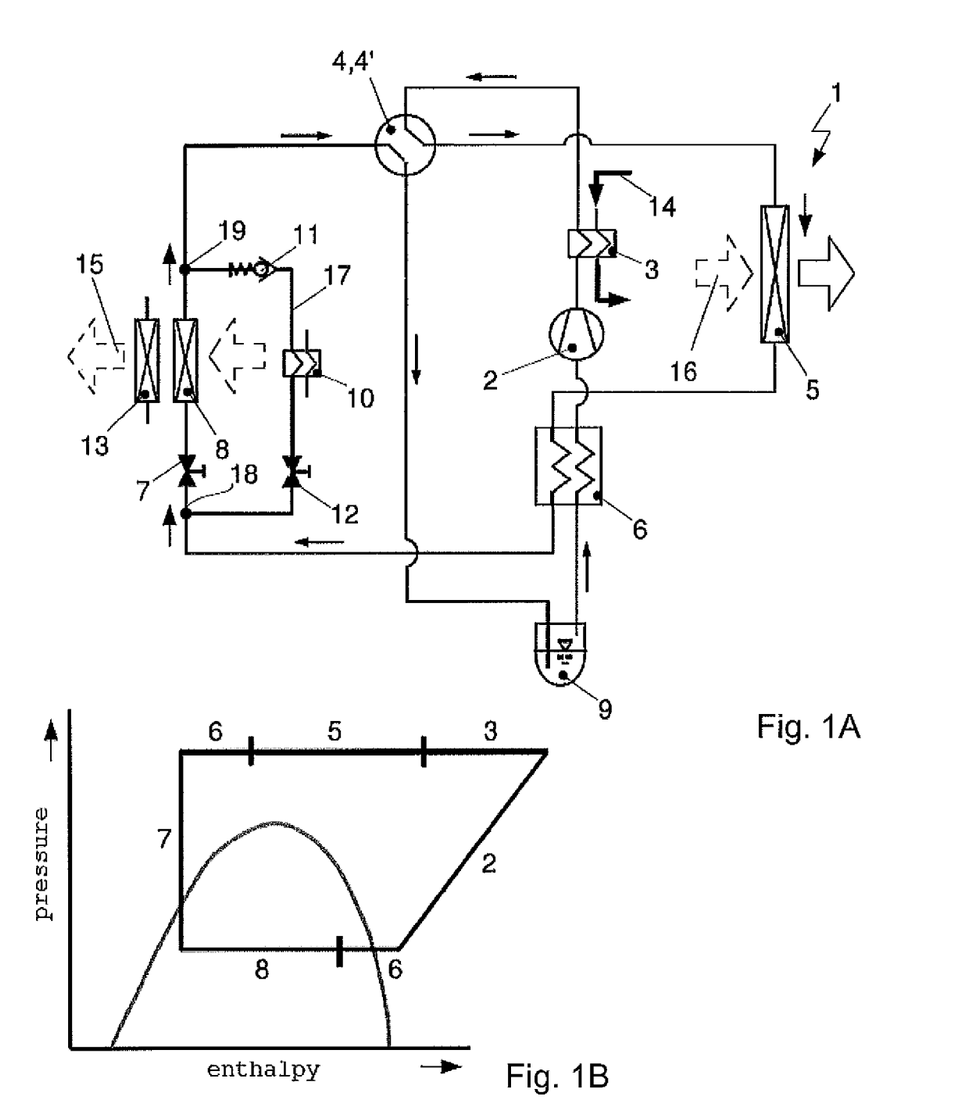
FIG. 1A: An air conditioning system with refrigerant circuit during operation in a refrigerator mode.
FIG. 1B: A pressure/enthalpy diagram of an operation of the refrigerant circuit in the refrigerator mode from FIG. 1A.

FIG. 1A shows an air conditioning system 1 with a refrigerant circuit during operation in a refrigerator mode. FIG. 1B shows a pressure/enthalpy diagram pertaining to the operation of the refrigerant circuit in the refrigerator mode. The changes in state upon flowing through the individual components of the refrigerant circuit are indicated with the reference numbers of the components.

The refrigerant circuit has a compressor 2 for compressing a refrigerant taken in, a refrigerant-coolant heat exchanger 3, also known as a coolant-cooled heat exchanger, for desuperheating the refrigerant, as well as a valve arrangement 4, 4' for switching the refrigerant circuit between different operating modes of the air conditioning system 1. The refrigerant is compressed in the compressor 2 from an evaporation pressure to a condensation pressure or from a low pressure to a high pressure and flows out from the compressor 2 as a gas, hot and superheated.

Upon flowing through the refrigerant-coolant heat exchanger 3, operated as a desuperheater or gas cooler, heat is transferred from the refrigerant to a coolant circulating in a coolant circuit, especially in a high temperature coolant circuit, in a flow direction 14. The heat transferred in the refrigerant-coolant heat exchanger 3 to the coolant is transported by the coolant circuit to at least one heat sink, such as the air mass flow being supplied to a passenger compartment and/or the outside air. According to an alternative embodiment, the heat transferred to the coolant can also be transported by several, that is, at least two, coolant circuits to the at least one heat sink. The refrigerant-coolant heat exchanger 3 is advantageously designed as a counterflow heat exchanger.

By means of the valve arrangement 4, 4' disposed in the flow direction of the refrigerant after the refrigerant-coolant heat exchanger 3, the flow direction of the refrigerant through the refrigerant circuit is adjusted depending on the operating mode of the refrigerant circuit. The valve arrangement 4, 4' receives a mass flow of the refrigerant with high temperature and a mass flow of the refrigerant with lower temperature, which can result in an unwanted heat transfer between the two mass flows of different temperature.

As a result of the design of the valve arrangement 4, 4', after the refrigerant flows out from the refrigerant-coolant heat exchanger 3 this unwanted heat transfer, which is a heat loss impairing the efficiency of the refrigerant circuit and thus of the air conditioning system 1, is minimized. The refrigerant becomes desuperheated upon flowing through the refrigerant-coolant heat exchanger 3, so that the temperature difference is decreased as the propulsive force for the heat transfer between the mass flows of different temperature.

When the refrigerant circuit is operating in the refrigerator mode per FIG. 1A, as already mentioned, the desuperheating heat and a portion of the heat of condensation or at least a portion of the desuperheating heat of the refrigerant is transferred to the coolant in the refrigerant-coolant heat exchanger 3. The heat built up in the coolant circuit in the refrigerant-coolant heat exchanger 3 is then surrendered by the coolant to the surrounding air. In this way, a larger portion of heat can be air conditioning systems, resulting in a higher efficiency when operating in refrigerator mode.

The use of two heat exchangers for the surrender of the heat of the refrigerant during the desuperheating and the condensation makes possible a greater degree of heat exchange in the refrigerator mode, which on the one hand can produce a greater transferable heat or a better utilization of the enthalpy of the liquefaction. On the other hand, the heat exchangers can be smaller in size, which for the same transferable heat results in lower costs and weight.

After flowing out from the valve arrangement 4, 4', the refrigerant is taken to a first refrigerant-air heat exchanger 5, which is operated as a condenser/gas cooler especially when operating in the refrigerator mode. The refrigerant-air heat exchanger 5 preferably receives surrounding air conveyed in a flow direction 16. The flow direction of the refrigerant is indicated here by solid arrows.

Next, the refrigerant flows through an internal heat exchanger 6 to a first expansion element 7, which is fashioned as an expansion valve, for example. Upon flowing through the first expansion element 7, the refrigerant is expanded to evaporation pressure and then taken through a second refrigerant-air heat exchanger 8. The second refrigerant-air heat exchanger 8 is operated as an evaporator when operating in refrigerator mode and serves to cool down or dehumidify the air mass flow being supplied in a flow direction 15 to the passenger compartment. The refrigerant-air heat exchanger 8 can be supplied with fresh air from the outside, surrounding air from the passenger compartment, or a mixture of fresh air and surrounding air.

If the liquefaction of the refrigerant occurs in subcritical operation, which is the case for example with a refrigerant R134a or under certain environmental conditions with carbon dioxide, the heat exchanger, here the refrigerant-air heat exchanger 3, is called a condenser. A portion of the heat transfer occurs at constant temperature. In supercritical operation or during supercritical heat transfer in the heat exchanger, the temperature of the refrigerant declines steadily. In this case, the heat exchanger is also called a gas cooler. Supercritical operation can occur under certain environmental conditions or modes of operation of the refrigerant circuit, for example with carbon dioxide as the refrigerant. A supercritical operation with carbon dioxide as refrigerant is shown by the pressure/enthalpy diagram of FIG. 1B.

After emerging from the refrigerant-air heat exchanger 8, the refrigerant is taken through the valve arrangement 4, 4' to a collector 9, in which the refrigerant having two phases is separated into a vapor phase and a liquid phase. The vaporous refrigerant is taken in by the compressor 2 and conveyed through the internal heat exchanger 6.

By the internal heat exchanger 6 is meant a circuit-internal heat exchanger which serves for the heat transfer between the refrigerant at high pressure and the refrigerant at low pressure. For example, the liquid refrigerant at high pressure is further cooled down between the processes of condensation and expansion, that is, after emerging from the refrigerant-air heat exchanger 5 operated as a condenser/gas cooler and on the other hand the gas taken in at low pressure is superheated before entering the compressor 2.

The refrigerant circuit furthermore has a refrigerant-coolant heat exchanger 10 booked up in parallel flow with the refrigerant-air heat exchanger 8, which is arranged inside a flow pathway 17 with an additional second expansion element 12 and a check valve 11. The flow pathway 17 here extends from a branch 18 arranged between the internal heat exchanger 6 and the first expansion element 7 to an opening 19 arranged between the refrigerant-air heat exchanger 8 and the valve arrangement 4, 4'. When the refrigerant circuit is operating in the pure refrigerator mode, the expansion element 12 is closed, so that refrigerant does not flow through the flow pathway 17 or thus also the refrigerant-coolant heat exchanger 10.

The air conditioning system 1 furthermore has at the air side a heating heat exchanger 13 connected downstream from the refrigerant-air heat exchanger 8 in the flow direction 15. The heating heat exchanger 13 is designed as a component of the coolant circuit, which also comprises the refrigerant-coolant heat exchanger 3 and does not receive coolant when the refrigerant circuit is operating in the refrigerator mode.

Figure 2:
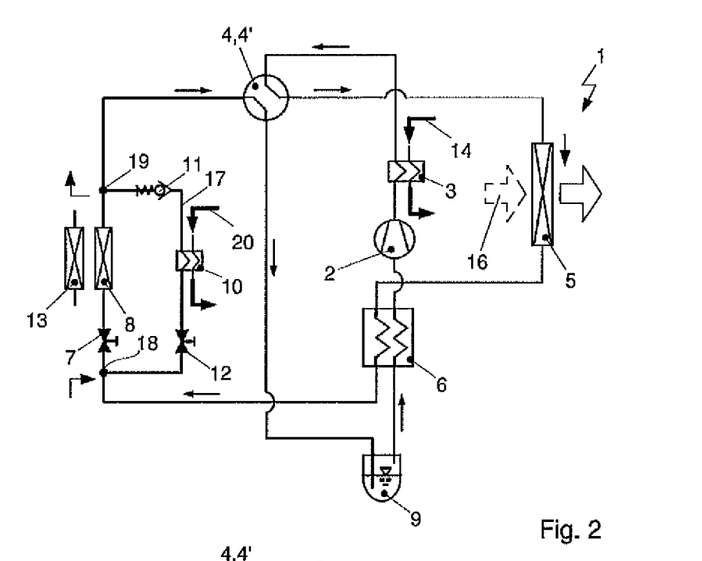
FIG. 2: The air conditioning system with refrigerant circuit of FIG. 1A during operation in a mode for cooling a component of a drive train of a motor vehicle.

FIG. 2 shows the air conditioning system 1 with the refrigerant circuit when operating in the mode of cooling a component of a drive train of the motor vehicle, such as a battery.

The difference from the operation of the refrigerant circuit in the refrigerator mode per FIG. 1A consists in the flow of the refrigerant at the low pressure side. The refrigerant after emerging from the internal heat exchanger 6 flows across the branch 18 through the flow pathway 17 to the opening 19 and thus through the second expansion element 12 to the refrigerant-coolant heat exchanger 10 and the check valve 11. The second expansion element 12 is consequently opened, the refrigerant flowing through it is expanded to a low pressure or an evaporation pressure, while the first expansion element 7 is closed. The refrigerant-coolant heat exchanger 10 operated as an evaporator of the refrigerant at the same time receives coolant in a flow direction 20 from a coolant circuit, especially a low temperature coolant circuit. The refrigerant takes up the heat from the coolant, which thereby becomes cooled down, in order to ensure later on the cooling of a component of the drive train, for example.

When the refrigerant circuit is operating in the mode for cooling of a component of the drive train, the expansion element 7 is closed, so that refrigerant does not flow through the refrigerant-air heat exchanger 8.

The air taken in the flow direction 16 across the refrigerant-air heat exchanger 5 is taken to the surroundings after taking up the heat from the refrigerant circuit. Alternatively, the air heated upon flowing across the refrigerant-air heat exchanger 5 operated as an evaporator of the refrigerant can also be taken into the passenger compartment as needed. The refrigerant-air heat exchanger 5 can be supplied with fresh air from the outside, surrounding air from the passenger compartment, or a mixture of fresh air and surrounding air.

Figure 3:
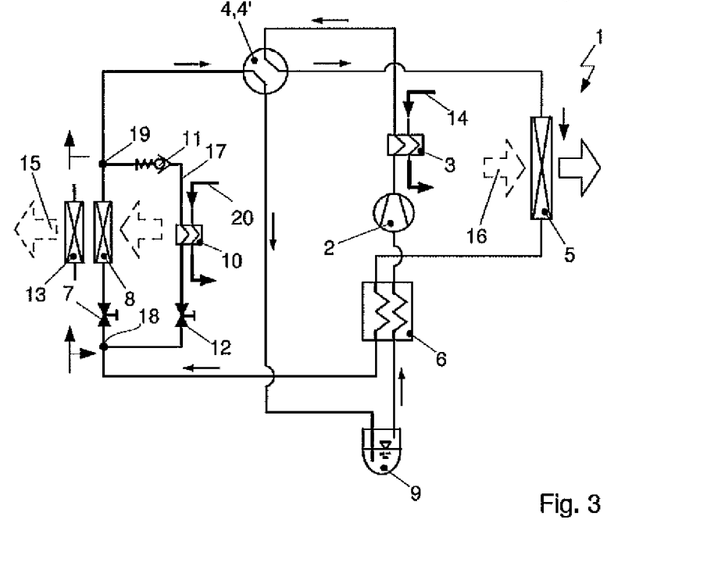
FIG. 3: The air conditioning system with refrigerant circuit of FIGS. 1A and 2 during a combined operation in the refrigerator mode and in the mode for cooling a component of the drive train of the motor vehicle.

FIG. 3 shows the air conditioning system 1 with the refrigerant circuit during combined operation in refrigerator mode and in the mode for cooling a component of the drive train of the motor vehicle.

The difference from the operation of the refrigerant circuit in the refrigerator mode per FIG. 1A, as in the case of the mode per FIG. 2, consists in the flow of the refrigerant at the low pressure side. The refrigerant, as in the mode of FIG. 2, flows across the branch 18 through the flow pathway 17 to the opening 19 and thus through the second expansion element 12 to the refrigerant-coolant heat exchanger 10 and the check valve 11. The second expansion element 12 is consequently opened, and the refrigerant flowing through it is expanded to low pressure or evaporation pressure. At the same time, coolant flows in the flow direction 20 through the refrigerant-coolant heat exchanger 10 operated as an evaporator of the refrigerant, preferably the coolant of the coolant circuit designed as a low temperature coolant circuit, which takes up heat from the coolant and thereby cools it down, so as to ensure the cooling of a component of the drive train, for example.

The first expansion element 7 is also opened. Upon flowing through the first expansion element 7, the refrigerant is likewise expanded to evaporation pressure and then taken through the refrigerant-air heat exchanger 8, operated as an evaporator of the refrigerant, which serves to cool down and dehumidify the air mass flow being taken to the passenger compartment in the flow direction 15.

The mass flow of the refrigerant at the low pressure side, especially at the branch 18, is consequently taken in a first partial mass flow through the refrigerant-air heat exchanger 8 and a second partial mass flow through the refrigerant-coolant heat exchanger 10. After taking up heat from the air mass flow being supplied to the passenger compartment and from the low temperature coolant circuit, the partial mass flows are again reunited at the opening 19 and taken to the valve arrangement 4, 4'.

The air taken in flow direction 16 across the refrigerant-air heat exchanger 5 is vented to the surroundings after taking up the heat from the refrigerant circuit. Alternatively, the air heated upon flowing across the refrigerant-air heat exchanger 5 operated as an evaporator of the refrigerant can also be taken as needed to the passenger compartment. The refrigerant-air heat exchanger 5 can be supplied with fresh air from the outside, surrounding air from the passenger compartment, or a mixture of fresh air and surrounding air.

Figure 4:
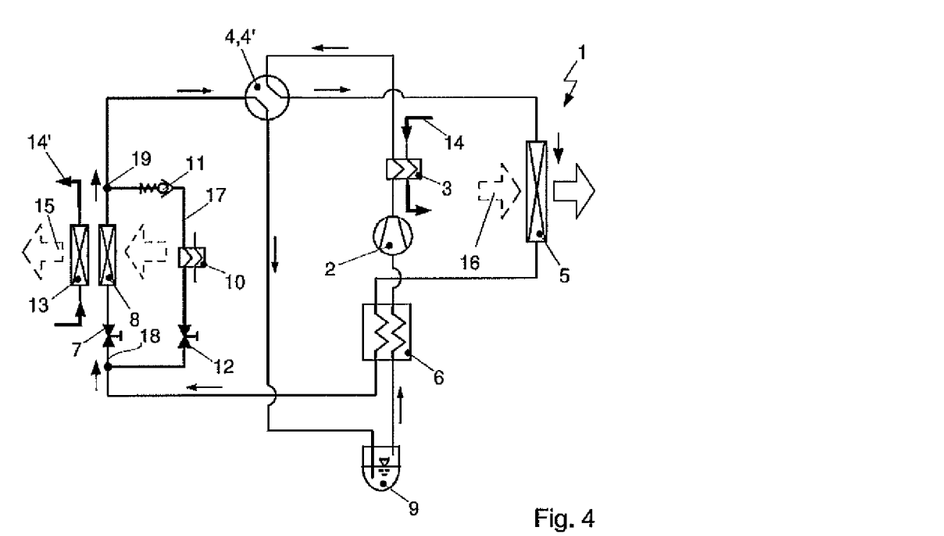
FIG. 4: The air conditioning system with refrigerant circuit of FIGS. 1A and 2-3 during operation in an afterheating mode.
Figure 5:
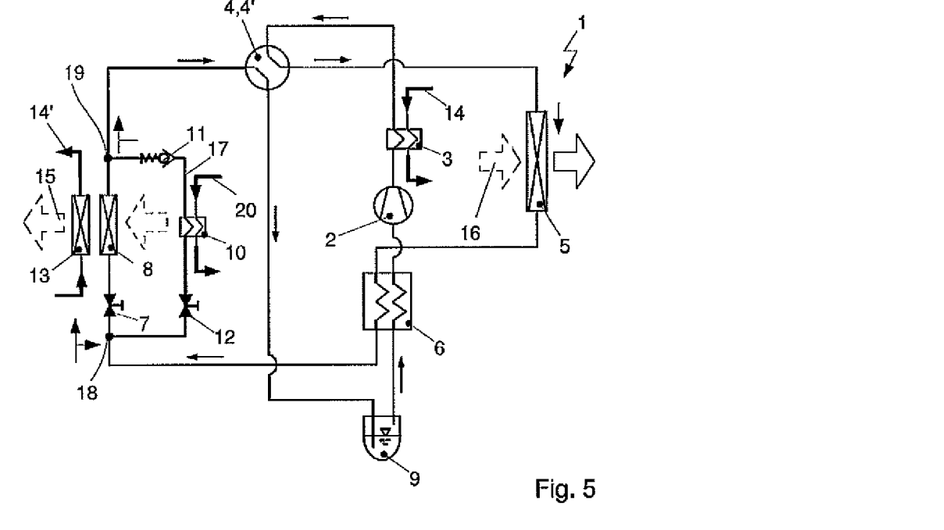
FIG. 5: The air conditioning system with refrigerant circuit of FIGS. 1A and 2-4 during a combined operation in the afterheating mode and in the mode for cooling the component of the drive train of the motor vehicle.

FIG. 4 shows the air conditioning system 1 with the refrigerant circuit during operation in the afterheating mode and FIG. 5 shows the air conditioning system 1 with the refrigerant circuit during combined operation in the afterheating mode and in the mode for cooling of a component of the drive train of the motor vehicle.

The operation of the refrigerant circuit in afterheating mode per FIG. 4 differs from the operation of the refrigerant circuit in refrigerator mode per FIG. 1A and the combined operation in the afterheating mode and in the mode for cooling of a component of the drive train per FIG. 5 differs from the combined operation in the refrigerator mode and in the mode for cooling of the component of the drive train per FIG. 3 only in that the heat of the coolant transferred in the refrigerant-coolant heat exchanger 3 from the superheated refrigerant to the coolant is transferred at least in part to the air mass flow being supplied to the passenger compartment. If the heat is not entirely surrendered to the air mass flow being supplied to the passenger compartment, a portion of the heat can also be taken away to the surrounding air, for example.

For the transfer of heat from the coolant to the air mass flow being supplied to the passenger compartment, at least a partial mass flow of the heated coolant is taken in a flow direction 14' through the heating heat exchanger 13 connected downstream from the refrigerant-air heat exchanger 8 in the flow direction 15.

The air mass flow taken in the flow direction 15 through the housing of the air conditioning system 1 is cooled down and/or dehumidified upon flowing across the refrigerant-air heat exchanger 8 operated as an evaporator and then heated upon flowing across the heating heat exchanger 13.

The air taken in the flow direction 16 across the refrigerant-air heat exchanger 5 operated as a condenser/gas cooler is vented to the surroundings after taking up the heat from the refrigerant circuit. Alternatively, the air heated upon flowing across the refrigerant-air heat exchanger 5 can also be taken as needed to the passenger compartment. The refrigerant-air heat exchanger 5 can be supplied with fresh air from the outside, surrounding air from the passenger compartment, or a mixture of fresh air and surrounding air.

Figure 6A:
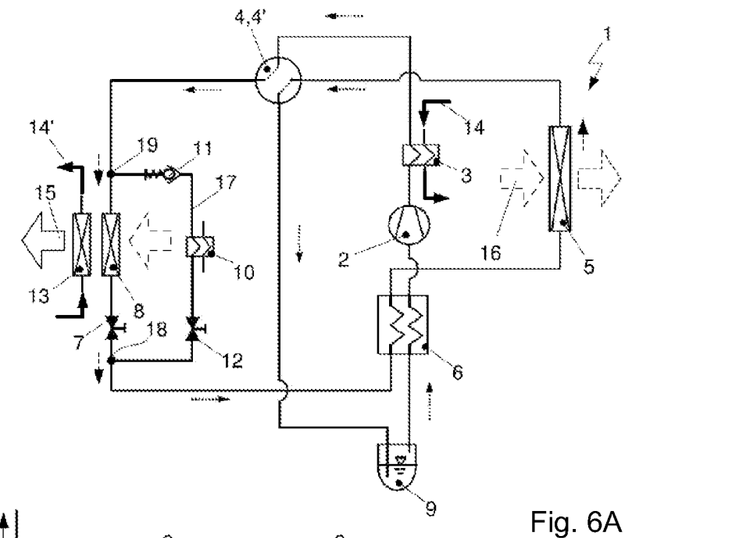
FIG. 6A: The air conditioning system with refrigerant circuit of FIGS. 1A and 2-5 during operation in a heat pump mode.
Figure 6B:
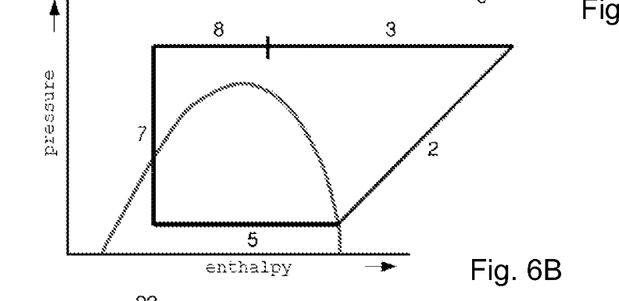
FIG. 6B: A pressure/enthalpy diagram of the operation of the refrigerant circuit in the heat pump mode of FIG. 6A.

FIG. 6A shows the air conditioning system 1 with the refrigerant circuit during operation in the heat pump mode. FIG. 6B shows the pressure/enthalpy diagram pertaining to the operation of the refrigerant circuit in the heat pump mode. The changes in state upon flowing through the individual components of the refrigerant circuit are indicated with the reference numbers of the components. The flow direction of the refrigerant in FIG. 6A is indicated by arrows of broken lines.

Upon flowing through the refrigerant-coolant heat exchanger 3 the desuperheating heat and a portion of the heat of condensation or at least a portion of the desuperheating heat of the refrigerant in the refrigerant-coolant heat exchanger 3 is transferred to the coolant circulating in the flow direction 14.

The valve arrangement 4, 4' placed after the refrigerant-coolant in the flow direction of the refrigerant is switched so that the refrigerant is taken to the second refrigerant-air heat exchanger 8, which is operated as a condenser/gas cooler during the operation in the heat pump mode. The refrigerant-air heat exchanger 8 is supplied with an air mass flow taken in the flow direction 15 and supplying the passenger compartment. The heat is transferred from the refrigerant to the air mass flow, which is thereby heated. Then the refrigerant flows through the first expansion element 7, becoming expanded to evaporation pressure, and is then taken through the internal heat exchanger 6 to the first refrigerant-air heat exchanger 5.

Coolant does not flow through the flow pathway 17 with the refrigerant-coolant heat exchanger 10 hooked up in parallel flow with the refrigerant-air heat exchanger 8 during the operation in heat pump mode. The check valve prevents refrigerant from entering from the direction of the opening 19. The expansion element 12 is preferably closed.

The first refrigerant-air heat exchanger 5 is operated as an evaporator and serves to transfer heat from the surrounding air, conveyed in the flow direction 16 across the refrigerant-air heat exchanger 5, to the refrigerant. The surrounding air serves as a heat source.

After emerging from the refrigerant-air heat exchanger 5, the refrigerant is taken by the valve arrangement 4, 4' to the collector 9, in which the refrigerant having two phases is separated into a vapor phase and a liquid phase. The vaporous refrigerant is taken in by the compressor 2 and conveyed through the internal heat exchanger 6.

As is also especially evident from FIG. 6B, little or no heat is transferred in the internal heat exchanger 6. Since the refrigerant having been expanded to low pressure upon flowing through the expansion element 7 before entering the internal heat exchanger 6 is essentially at evaporation pressure and also flows out from the refrigerant-air heat exchanger 5 superheated at the low pressure level with evaporation temperature, the refrigerant on both sides of the internal heat exchanger 6 has the same or at least very similar temperatures.

During operation in the heat pump mode, the refrigerant flows through the internal heat exchanger 6 in the same flow direction. By comparison, the internal heat exchanger 6 in both the refrigerator mode per FIGS. 1A, 2 and 3 and in the afterheating mode per FIGS. 4 and 5 is operated in a counter-flow direction.

When operating in the heat pump mode, the heat in the heating heat exchanger 13 transferred by the refrigerant-coolant heat exchanger 3 to the coolant circulating in the coolant circuit, especially high temperature coolant, is once again surrendered to the air being supplied to the passenger compartment.

The air being supplied to the passenger compartment, such as outside air with a very low temperature, surrounding air from the passenger compartment or a mixture of outside air and surrounding air is heated in two steps, that is, by taking up heat upon flow through the refrigerant-air heat exchanger 8 and by additionally taking up heat upon flow through the heating heat exchanger 13.

With the multistaged heating of the air being supplied to the passenger compartment by means of the refrigerant-air heat exchanger 8 in the first stage and the heating heat exchanger 13 in the second stage, the efficiency ratio of the air conditioning system when operating in heat pump mode can be boosted substantially as compared to systems known from the prior art with a single-stage heating of the air with coolant through a heating heat exchanger.

On the one hand, the refrigerant in the refrigerant-air heat exchanger 8 thanks to a large possible temperature spread between inlet and outlet can be greatly supercooled, thereby increasing the critical enthalpy difference for operation in heat pump mode. The temperature spread is otherwise limited to avoid overly large temperature differences of the air being supplied to the passenger compartment, that is, to limit the temperature stratification. With a desuperheating and condensation of the refrigerant solely in the refrigerant-coolant heat exchanger 3 the refrigerant could not be supercooled to such a low temperature on account of the limited temperature spread of the coolant. But thanks to the subsequent second state of heating of the air being supplied to the passenger compartment by means of the heating heat exchanger 13 at the exit from the refrigerant-air heat exchanger 8 the refrigerant can be cooled down to a temperature far below an inlet temperature of the coolant in the refrigerant-coolant heat exchanger 3.

Furthermore, the heating heat exchanger 13 of the second stage of the air heating ensures a temperature stratification which corresponds to comfort requirements in the passenger compartment. On the other hand, it guarantees that the coolant does not go beyond an established temperature spread.

Figure 7A:
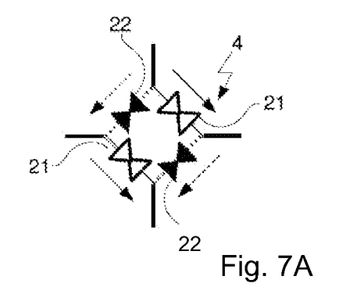
FIG. 7A: A valve arrangement of the air conditioning system with refrigerant circuit of FIGS. 1A and 2-6A for switching the refrigerant circuit between the different operating modes of the air conditioning system with four shutoff valves.
Figure 7B:
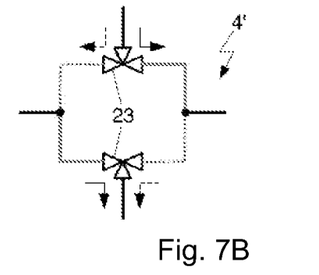
FIG. 7B: A valve arrangement of the air conditioning system with refrigerant circuit of FIGS. 1A and 2-6A for switching the refrigerant circuit between the different operating modes of the air conditioning system with two three-way valves.

FIGS. 7A and 7B each show a valve arrangement 4, 4' for the switching of the refrigerant circuit between different operating modes of the air conditioning system 1. The valve arrangements 4, 4' are designed with four connections for refrigerant lines. FIG. 7A shows a valve arrangement 4 having four shutoff valves 21, 22, while valve arrangement 4' of FIG. 7B is provided with two three-way valves.

In the valve arrangement 4 of FIG. 7A, there are two shutoff valves 21 with a NO characteristic and two shutoff valves 22 with an NC characteristic switched together in parallel. A valve with a NO characteristic is "open" in the unswitched and thus no-flow state, where NO stands for "normally open". A valve with a NC characteristic is "closed" in the unswitched, no-flow state. NC stands for "normally closed".

In the valve arrangement 4, the inlet of a first shutoff valve 21 and the inlet of a first shutoff valve 22 are connected to each other and to a first refrigerant line. The outlet of the first shutoff valve 21 and the inlet of a second shutoff valve 22 are coupled together and to a second refrigerant line, while the outlet of the first shutoff valve 22 and the inlet of a second shutoff valve 21 are coupled together and to a third refrigerant line. Finally, the outlet of the second shutoff valve 21 and the outlet of the second shutoff valve 22 are connected to each other and to a first refrigerant line.

The refrigerant during operation in refrigerator mode and in afterheating mode flows through the opened shutoff valves 21 with NO characteristic, while the shutoff valves 22 with NC characteristic are closed. During operation in the heat pump mode, the refrigerant flows through the opened shutoff valves 22 with NC characteristic, while the shutoff valves 21 with NO characteristic are closed.

In the valve arrangement 4' of FIG. 7B, two three-way valves 23 are coupled together across refrigerant lines. A first three-way valve 23 is operated with one inlet and two outlets and a second three-way valve 23 with two inlets and one outlet. The two outlets of the first three-way valve 23 are connected across one refrigerant line each to an inlet of the second three-way valve 23, while the refrigerant lines connecting the outlets to the inlets each have a branch, formed for example as a T-piece.

LIST OF REFERENCE SYMBOLS

1 Air conditioning system
2 Compressor
3 Refrigerant-coolant heat exchanger
4, 4' Valve arrangement
5 First refrigerant-air heat exchanger
6 Internal heat exchanger
7 First expansion element
8 Second refrigerant-air heat exchanger
9 Collector
10 Refrigerant-coolant heat exchanger
11 Check valve
12 Second expansion element
13 Heating heat exchanger of high temperature coolant circuit
14,14' Flow direction of coolant of high temperature coolant circuit
15,16 Flow direction of air
17 Flow pathway
18 Branch
19 Opening
20 Flow direction of coolant of low temperature coolant circuit
21 Shutoff valve with NO characteristic
22 Shutoff valve with NC characteristic
23 Three-way valve

What is claimed is:

1. An air conditioning system for conditioning air of a passenger compartment of a motor vehicle comprising:
a refrigerant circuit including a compressor configured for compressing a refrigerant flowing through the refrigerant circuit, a refrigerant-coolant heat exchanger configured for desuperheating the refrigerant, a first refrigerant-air heat exchanger in fluid communication with the compressor, and a second refrigerant-air heat exchanger in fluid communication with the compressor, the refrigerant-coolant heat exchanger disposed downstream of the compressor with respect to a direction of flow of the refrigerant through the compressor, wherein a first expansion element is disposed intermediate the first refrigerant-air heat exchanger and the second refrigerant-air heat exchanger, wherein a secondary refrigerant-coolant heat exchanger is disposed in parallel with the second refrigerant-air heat exchanger, wherein the secondary refrigerant-coolant heat exchanger is disposed in a flow pathway extending from a branch to an opening, the branch disposed intermediate the first refrigerant-air heat exchanger and the first expansion element, the opening disposed intermediate the second refrigerant-air heat exchanger and the compressor, wherein a second expansion element is disposed intermediate the secondary refrigerant-coolant heat exchanger and the branch, wherein a check valve is disposed intermediate the secondary refrigerant-coolant heat exchanger and the opening;
a coolant circuit conveying a coolant therethrough, the coolant circuit including a heating heat exchanger configured for heating air conveyed through the air conditioning system, the heating heat exchanger in fluid communication with the refrigerant-coolant heat exchanger, the coolant circuit and the refrigerant circuit selectively operable between a refrigerator mode, a heat pump mode, and an afterheating mode, wherein the coolant flows through the refrigerant-coolant heat exchanger in each of the refrigerator mode, the heat pump mode, and the afterheating mode, and wherein the coolant selectively flows through the heating heat exchanger only in the heat pump mode and the afterheating mode;
a valve arrangement disposed in the refrigerant circuit and selectively switching the coolant circuit and the refrigerant circuit between the refrigerator mode, the heat pump mode, and the afterheating mode.

2. The air conditioning system of claim 1, wherein the valve arrangement is disposed downstream from the refrigerant-coolant heat exchanger with respect to the direction of flow of the refrigerant through the compressor.

3. The air conditioning system of claim 2, wherein the valve arrangement is disposed intermediate the refrigerant-coolant heat exchanger and the first refrigerant-air heat exchanger with respect to the direction of flow of the refrigerant through the compressor or intermediate the refrigerant-coolant heat exchanger and the second refrigerant-air heat exchanger with respect to the direction of flow of the refrigerant through the compressor.

4. The air conditioning system of claim 1, wherein the second refrigerant-air heat exchanger is one of an evaporator and a liquefier.

5. The air conditioning system of claim 1, wherein the first refrigerant-air heat exchanger is one of an evaporator and a liquefier.

6. The air conditioning system of claim 1, wherein the heating heat exchanger is disposed adjacent and downstream from the second refrigerant-air heat exchanger with respect to a flow of air through the air conditioning system.

7. The air conditioning system of claim 1, wherein refrigerant flows through the first refrigerant-air heat exchanger in a first direction in the refrigerator mode and the afterheating mode, and wherein the refrigerant flows through the first refrigerant-air heat exchanger in a second direction in the heat pump mode.

8. The air conditioning system of claim 1, wherein the refrigerant flows through the second refrigerant-air heat exchanger in a first direction in the refrigerator mode and the afterheating mode, and wherein the refrigerant flows through the second refrigerant-air heat exchanger in a second direction in the heat pump mode.

9. The air conditioning system of claim 1, wherein the valve arrangement includes four shutoff valves, a first one of the shutoff valves and a second one of the shutoff valves are open in the refrigerator mode and the afterheating mode, a third one of the shutoff valves and a fourth one of the shutoff valves are closed in the refrigerator mode and the afterheating mode.

10. The air conditioning system of claim 1, wherein the valve arrangement includes a pair of three-way valves, a first one of the pair of three-way valves including one inlet and two outlets and a second one of the pair of three-way valves including two inlets and one outlet.

11. The air conditioning system of claim 1, further comprising an internal heat exchanger disposed in the refrigerant circuit, the internal heat exchanger exchanging heat between the refrigerant flowing upstream of the compressor with the refrigerant flowing downstream of the compressor.

12. An air conditioning system for conditioning air of a passenger compartment of a motor vehicle comprising:
a refrigerant circuit including a compressor configured for compressing a refrigerant flowing through the refrigerant circuit, a refrigerant-coolant heat exchanger configured for desuperheating the refrigerant, a first refrigerant-air heat exchanger in fluid communication with the compressor, and a second refrigerant-air heat exchanger in fluid communication with the compressor, the refrigerant-coolant heat exchanger disposed downstream of the compressor with respect to a direction of the refrigerant flowing through the compressor, wherein a first expansion element is disposed intermediate the first refrigerant-air heat exchanger and the second refrigerant-air heat exchanger, wherein a secondary refrigerant-coolant heat exchanger is disposed in parallel with the second refrigerant-air heat exchanger, wherein the secondary refrigerant-coolant heat exchanger is disposed in a flow pathway extending from a branch to an opening, the branch disposed intermediate the first refrigerant-air heat exchanger and the first expansion element, the opening disposed intermediate the second refrigerant-air heat exchanger and the compressor, wherein a second expansion element is disposed intermediate the secondary refrigerant-coolant heat exchanger and the branch, wherein a check valve is disposed intermediate the secondary refrigerant-coolant heat exchanger and the opening;
a coolant circuit conveying a coolant therethrough, the coolant circuit including a heating heat exchanger configured for heating air conveyed through the air conditioning system, the heating heat exchanger in fluid communication with the refrigerant-coolant heat exchanger, the coolant circuit and the refrigerant circuit selectively operable between a refrigerator mode, a heat pump mode, and an afterheating mode, wherein the coolant flows through the refrigerant-coolant heat exchanger in each of the refrigerator mode, the heat pump mode, and the afterheating mode, and wherein the coolant selectively flows through the heating heat exchanger in only the heat pump mode and the afterheating mode;
a valve arrangement disposed in the refrigerant circuit and selectively switching the coolant circuit and the refrigerant circuit between the refrigerator mode, the heat pump mode, and the afterheating mode, the valve arrangement including four shutoff valves, a first one of the shutoff valves and a second one of the shutoff valves are open in the refrigerator mode and the afterheating mode, a third one of the shutoff valves and a fourth one of the shutoff valves are closed in the refrigerator mode and the afterheating mode; and
an internal heat exchanger disposed in the refrigerant circuit, the internal heat exchanger exchanging heat between the refrigerant flowing upstream of the compressor with the refrigerant flowing downstream of the compressor.

13. A method for operating an air conditioning system for conditioning air of a passenger compartment of a motor vehicle comprising the steps of:
providing a refrigerant circuit including a compressor configured for compressing a refrigerant flowing through the refrigerant circuit and a refrigerant-coolant heat exchanger, the refrigerant-coolant heat exchanger disposed downstream of the compressor with respect to a direction of the refrigerant flowing through the compressor, wherein a first expansion element is disposed intermediate the first refrigerant-air heat exchanger and the second refrigerant-air heat exchanger, wherein a secondary refrigerant-coolant heat exchanger is disposed in parallel with the second refrigerant-air heat exchanger, wherein the secondary refrigerant-coolant heat exchanger is disposed in a flow pathway extending from a branch to an opening, the branch disposed intermediate the first refrigerant-air heat exchanger and the first expansion element, the opening disposed intermediate the second refrigerant-air heat exchanger and the compressor, wherein a second expansion element is disposed intermediate the secondary refrigerant-coolant heat exchanger and the branch, wherein a check valve is disposed intermediate the secondary refrigerant-coolant heat exchanger and the opening;
providing a coolant circuit conveying a flow of coolant therethrough, the coolant circuit including a heating heat exchanger configured for heating air conveyed through the air conditioning system to the passenger compartment, the heating heat exchanger in fluid communication with the refrigerant-coolant heat exchanger, the coolant circuit and the refrigerant circuit selectively operable between a refrigerator mode, a heat pump mode, and an afterheating mode, wherein the coolant flows through the refrigerant-coolant heat exchanger in each of the refrigerator mode, the heat pump mode, and the afterheating mode, and wherein the coolant selectively flows through the heating heat exchanger in only the hat pump mode and the afterheating mode;
selectively switching between the refrigerator mode, the heat pump mode, and the after heating mode with a valve arrangement, the valve arrangement disposed in the refrigerant circuit downstream of the compressor with respect to the direction of the refrigerant flowing through the compressor;
compressing the refrigerant in the compressor; and
at least one of partially desuperheating and partially liquefying the refrigerant after being compressed by the compressor and before flowing through the valve arrangement.

14. The method of claim 13, further comprising the steps of at least partially desuperheating and at least partially liquefying the refrigerant in the refrigerant-coolant heat exchanger, wherein heat is transferred from the refrigerant to the flow of coolant through the refrigerant-coolant heat exchanger.

15. The method of claim 14, further comprising the step of transferring heat from the flow of coolant through the refrigerant-coolant heat exchanger to the air flowing through the air conditioning system.

* * * * *